Figure 1:
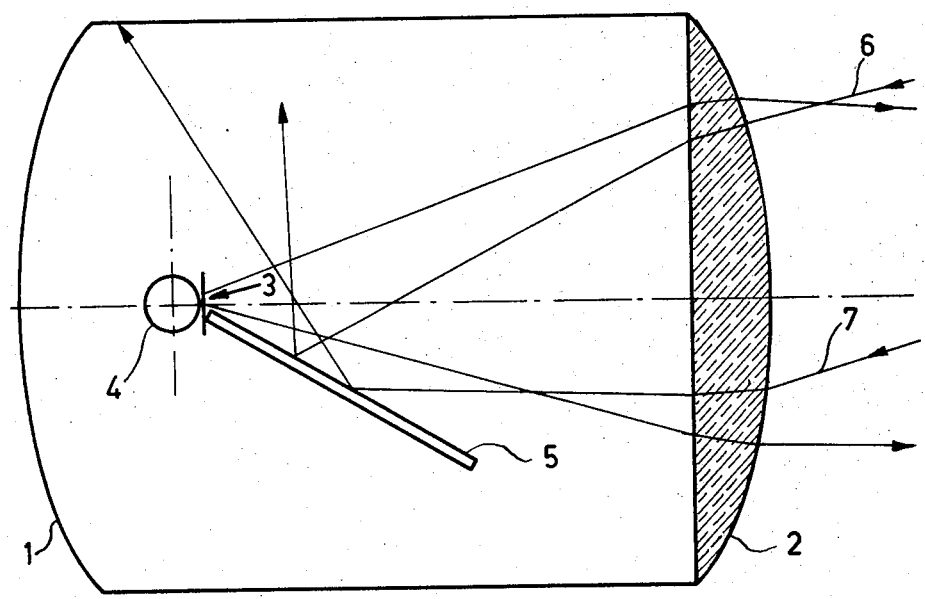

United States Patent [19]
Rijnders

[11] 3,808,424
[45] Apr. 30, 1974

[54] SIGNAL LAMP
[75] Inventor: Johannes Rijnders, Emmasingel, Eindhoven, Netherlands
[73] Assignee: U.S. Philips Corporation, New York, N.Y.
[22] Filed: Jan. 2, 1973
[21] Appl. No.: 319,981

[30] Foreign Application Priority Data
Jan. 26, 1972 Netherlands.................. 7201040

[52] U.S. Cl.................. 240/41.3, 240/22, 340/382
[51] Int. Cl............................................. F21v 13/04
[58] Field of Search......... 240/41.3, 41.35 R, 46.47, 240/46.49, 46.59, 22, 23; 340/382, 383

[56] References Cited
UNITED STATES PATENTS
| | | | |
|---|---|---|---|
| 2,336,680 | 12/1943 | Gillespie | 340/382 |
| 2,975,268 | 3/1961 | Craig et al. | 240/46.59 |
| 3,245,075 | 4/1966 | Staats | 340/382 |
| 2,458,401 | 1/1949 | Moore | 240/23 |

Primary Examiner—Richard L. Moses
Attorney, Agent, or Firm—Frank R. Trifari

[57] ABSTRACT

The invention relates to a signal lamp comprising a light source, an optical system and a mirror in which, in order to prevent the so-called phantom phenomenon, the mirror and the light source are arranged on either side of the focus of the optical system.

4 Claims, 2 Drawing Figures

PATENTED APR 30 1974 3,808,424

SIGNAL LAMP

The invention relates to a signal lamp, in particular destined for giving light signals to traffic participants, which lamp comprises a light source and an optical system for concentrating the light rays orginate from the light source, said lamp furthermore comprising at least one screen which extends between the light source and the optical means and serves to interrupt incident light rays originating from above the optical axis. Such a signal lamp is known.

In the signal lamps used in traffic, for example traffic lights, it should be prevented that incident light, notably sunlight, is reflected so that the traffic participant gets the impression that the lamp is burning. This phenomenon is known as the phantom phenomenon. In the known signal lamp the centre of the light source coincides with the focus of the optical system, while in order to prevent said phantom phenomenon the screen is in the form of a plane of revolution, preferably a conical section, in which the tip of the cone lies in the focus. In order to absorb the incident light rays, the screen is blackened.

The drawback of this signal lamp is that the phantom phenomenon is not prevented entirely because incident light rays can impinge upon the light source. This is the case notably when the lamp is arranged in such manner that the optical axis extends horizontally and the incident light from a sun which is close to the horizon is concentrated by an optical system onto the part of the light source present below the optical axis. The light source which usually is in the form of an incandescent lamp lights up slightly as a result, which lighting up is observed outside the lamp as a weak signal. Furthermore, a screen which fully absorbs the incident light cannot be realized in practice. The result of this is that the black screen will reflect the light, albeit to a small extent, which contributes to the phantom phenomenon.

It is the object of the invention to provide a signal lamp which does not exhibit said drawbacks.

For that purpose, the signal lamp according to the invention is characterized in that the screen and the light source are each arranged on one side of the focus of the optical system, the focus lying on or near an edge of the screen.

Because the screen extends to in the focus of the optical system and the light source, viewed from the optical system, is arranged behind the focus, the light originating from above the optical axis will impinge upon the screen.

The screen is preferably in the form of a mirror which is arranged in the lamp so that light rays originating from above the optical axis of the lamp and impinging upon the optical system and the mirror are reflected by the mirror in an upward direction away from the optical system. By the mirror the light is reflected, for example, on a part of the inner wall of the signal lamp, which part is located relative to the optical system in such manner that the lighting up of said part will not result in a wrong interpretation of the light signal.

A favourable embodiment of the signal lamp according to the invention is characterized in that the optical system is formed by a lens, the mirror being constructed as a flat mirror and extending from the focus in the direction of the side of the lens present below the optical axis. The lens which may be coloured or be provided with an indication also serves as a closure of the signal lamp.

The optical means may also be formed by a section of a parabolically shaped reflector, in which the mirror extends upwards obliquely from the focus.

Figure 2:
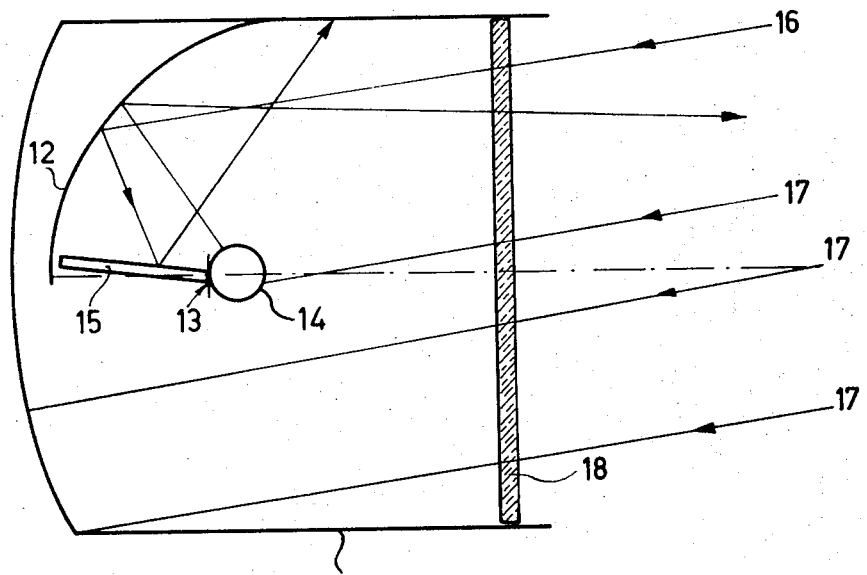

The invention will be described in greater detail with reference to a drawing, in which:

FIG. 1 shows diagrammatically a signal lamp according to the invention in which the optical system is formed by a lens, FIG. 2 shows diagrammatically a signal lamp according to the invention in which the optical system is formed by a section of a parabolically shaped reflector.

The signal lamp shown in FIG. 1 comprises a housing 1 which is closed by a lens 2 the axis of which in this embodiment extends horizontally and the focus of which is denoted by 3. Accommodated in the lamp are furthermore an incandescent lamp 4 and a screen 5 in the form of a flat mirror. The mirror 5 extends from the focus 3 in the direction of the lower edge of the lens 2. The lamp 4 is present on the side of the focus remote from the lens and nearly engages the edge of the mirror 5. Because as a result of this arrangement of the lamp and the mirror only the part of the lamp present above the axis transmits light in the direction of the lens, a diverging light beam which is limited at its upper side horizontally is emitted by the lamp. The light beams 6 and 7 which are incident from above the horizontal optical axis are thrown on the mirror 5 by the lens 2 which reflects said rays in an upward direction. The inner wall of the housing 1 is blackened so as to absorb the radiation. Because the part of the inner wall of the housing on which said light rays are incident extends transversely to the plane of the lens, the reflection of said light, since it is not fully absorbed, cannot result in a wrong interpretation of the signal.

The embodiment of the signal lamp according to the invention shown in FIG. 2 comprises a housing 11, a section 12 of a parabolic reflector, a lamp 14 and a flat mirror 15. The housing is covered by a plate 18 of a transparent material which may be coloured. The mirror 15 extends from the focus 13 of the reflector 12 in an obliquely upward direction. The lamp 14 is present as close as possible to the edge of the mirror. As a result of this arrangement of the lamp and the mirror a light bea is emitted by beam lamp in this embodiment of the signal lamp also, which beam is limited horizontally mainly on its upper side. The ray 16 originating from above the optical axis and impinging upon the reflector 12 is reflected by the mirror 15 in the direction of the blackened inner wall of the housing 11. The greater part of the light rays 17 which originate from above the optical axis and penetrate into the housing via a lower part of the transparent plate are absorbed by the black inner wall of the housing. A small part of said radiation will inpinge upon the lamp 14 and be slightly reflected by it. Because, however, the incident light is not concentrated by the plate 18, the reflection by the lamp is so small, that this is not experienced to be deceptive.

What is claimed is:

1. A signal lamp, particularly intended for providing light signals to traffic participants, comprising a light source and an optical system for concentrating the light rays originating from the light source, said lamp further comprising at least one screen which extends between the light source and the optical system and which serves to interrupt incident light rays originating from above the optical axis of the lamp, the screen and the light source each being arranged on opposite sides of the focus of the optical system, the focus lying on or near an edge of the screen.

2. A signal lamp, particularly intended for providing light signals to traffic participants, comprising a light source and an optical system for concentrating the light rays originating from the light source, said lamp further comprising at least one screen which extends between the light source and the optical system and which serves to interrupt incident light rays originating from above the optical axis of the lamp, the screen and the light source each being arranged on opposite sides of the focus of the optical system, the focus lying on or near an edge of the screen and wherein the screen is in the form of a mirror which is arranged within the lamp such that light rays impinging upon the optical system and originating from above the axis of the lamp are reflected by the mirror in a direction above the optical axis and away from the optical system.

3. A signal lamp particularly intended for providing light signals to traffic participants, comprising a light source and an optical system for concentrating the light rays originating from the light source, said lamp further comprising at least one screen which extends between the light source and the optical system and which serves to interrupt incident light rays originating from above the optical axis of the lamp, the screen and the light source each being arranged on opposite sides of the focus of the optical system, the focus lying on or near an edge of the screen and wherein the optical system is in the form of a lens and the screen is in the form of a flat mirror which extends from the focus in the direction of the portion of the lens disposed below the optical axis.

4. A signal lamp particularly intended for providing light signals to traffic participants, comprising a light source and an optical system for concentrating the light rays originating from the light source, said lamp further comprising at least one screen which extends between the light source and the optical system and which serves to interrupt incident light rays originating from above the optical axis of the lamp, the screen and the light source each being arranged on opposite sides of the focus of the optical system, the focus lying on or near an edge of the screen and wherein the optical system is in the form of a section of a parabolically shaped reflector positioned behind the light source and the screen is in the form of a flat mirror extending from the focus in a direction above the optical axis and toward the reflector.

* * * * *

UNITED STATES PATENT OFFICE
CERTIFICATE OF CORRECTION

Patent No. 3808424          Dated April 13, 1974

Inventor(s) JOHANNES RIJNDERS

It is certified that error appears in the above-identified patent and that said Letters Patent are hereby corrected as shown below:

Column I, line 6, "originate" should be

-- originating --

Column II, line 47 "bea" should be

-- beam --

Column II, line 47, before "lamp" delete

"beam" and insert -- the -- .

Signed and sealed this 22nd day of October 1974.

(SEAL)
Attest:

McCOY M. GIBSON JR.          C. MARSHALL DANN
Attesting Officer          Commissioner of Patents